US012800828B2

(12) United States Patent
Duong et al.

(10) Patent No.: US 12,800,828 B2
(45) Date of Patent: Nov. 17, 2026

(54) GLASS RECIRCULATOR FOR OPTICAL SIGNAL REROUTING ACROSS PHOTONIC INTEGRATED CIRCUITS

(71) Applicant: Intel Corporation, Santa Clara, CA (US)

(72) Inventors: Benjamin Duong, Phoenix, AZ (US); Kristof Darmawikarta, Chandler, AZ (US); Srinivas Venkata Ramanuja Pietambaram, Chandler, AZ (US); Sandeep Gaan, Phoenix, AZ (US)

(73) Assignee: Intel Foundry IP LLC, Santa Clara, CA (US)

( * ) Notice: Subject to any disclaimer, the term of this patent is extended or adjusted under 35 U.S.C. 154(b) by 136 days.

(21) Appl. No.: 17/957,094

(22) Filed: Sep. 30, 2022

(65) Prior Publication Data

US 2024/0111093 A1 Apr. 4, 2024

(51) Int. Cl.

*G02B 6/122* (2006.01)
*G02B 6/13* (2006.01)

(52) U.S. Cl.

CPC ............... *G02B 6/122* (2013.01); *G02B 6/13* (2013.01)

(58) Field of Classification Search

CPC ...... G02B 6/122; G02B 6/13; G02B 6/12002; G02B 6/12004; G02B 6/125; G02B 6/30

See application file for complete search history.

(56) References Cited

U.S. PATENT DOCUMENTS

| | | | | |
|---|---|---|---|---|
| 6,952,049 | B1 | 10/2005 | Ogawa et al. | |
| 8,872,349 | B2 | 10/2014 | Chiu et al. | |
| 10,698,164 | B2 * | 6/2020 | Psaila | G02B 6/13 |
| 2006/0169973 | A1 | 8/2006 | Isa et al. | |
| 2010/0187683 | A1 | 7/2010 | Bakir et al. | |
| 2010/0244230 | A1 | 9/2010 | Oi | |
| 2010/0316327 | A1 | 12/2010 | Montoya et al. | |
| 2010/0320496 | A1 | 12/2010 | Nishi et al. | |
| 2011/0304999 | A1 | 12/2011 | Yu et al. | |
| 2014/0056554 | A1 | 2/2014 | Brunner et al. | |
| 2014/0078704 | A1 | 3/2014 | Andry et al. | |
| 2014/0231986 | A1 | 8/2014 | Dubin | |
| 2014/0339705 | A1 | 11/2014 | Yee | |
| 2015/0334823 | A1 | 11/2015 | Hu | |
| 2016/0043068 | A1 | 2/2016 | Ramachandran et al. | |
| 2016/0126286 | A1 | 5/2016 | Igarashi et al. | |
| 2016/0374198 | A1 | 12/2016 | Kim et al. | |
| 2018/0026666 | A1 | 1/2018 | Yun et al. | |
| 2018/0102311 | A1 | 4/2018 | Shih | |
| 2018/0344245 | A1 | 12/2018 | Knickerbocker et al. | |
| 2019/0074240 | A1 | 3/2019 | Levesque, Jr. et al. | |

(Continued)

FOREIGN PATENT DOCUMENTS

| | | | |
|---|---|---|---|
| JP | 6840935 | B | 3/2021 |
| WO | 2017172677 | A1 | 10/2017 |

*Primary Examiner* — John Bedtelyon
(74) *Attorney, Agent, or Firm* — Akona IP PC

(57) ABSTRACT

Various embodiments disclosed relate to routing optical signals from silicon photonics, such as a photonic integrated circuit. The present disclosure includes a glass recirculatory layer with waveguides at varying heights to allow re-routing of such optical signals from silicon photonics, such as a photonic integrated circuit. Re-routing of optical signals can be accomplished in the glass recirculatory layer with reduced losses due to reduced intersections of waveguides therein.

20 Claims, 4 Drawing Sheets

(56) References Cited

U.S. PATENT DOCUMENTS

| | | | |
|---|---|---|---|
| 2019/0124772 | A1 | 4/2019 | Stahr et al. |
| 2019/0172821 | A1 | 6/2019 | Yim |
| 2019/0304877 | A1 | 10/2019 | Mobley et al. |
| 2020/0027728 | A1 | 1/2020 | Wang et al. |
| 2020/0058567 | A1 | 2/2020 | Kim et al. |
| 2020/0203266 | A1 | 6/2020 | Iwai et al. |
| 2020/0279840 | A1 | 9/2020 | Janta-Polczynski et al. |
| 2021/0118698 | A1 | 4/2021 | Sawadaishi |
| 2021/0257741 | A1 | 8/2021 | Flemming et al. |
| 2021/0375846 | A1 | 12/2021 | Chen et al. |
| 2022/0155539 | A1 | 5/2022 | Pietambaram et al. |
| 2022/0216192 | A1 | 7/2022 | Jeng et al. |
| 2022/0375865 | A1 | 11/2022 | Pietambaram et al. |
| 2023/0085411 | A1 | 3/2023 | Paital et al. |
| 2023/0092740 | A1 | 3/2023 | Pietambaram et al. |
| 2023/0187205 | A1 | 6/2023 | Wang et al. |
| 2024/0087971 | A1 | 3/2024 | Marin et al. |

* cited by examiner

GLASS RECIRCULATOR FOR OPTICAL SIGNAL REROUTING ACROSS PHOTONIC INTEGRATED CIRCUITS

TECHNICAL FIELD

Embodiments described herein generally relate to semiconductor devices and packaging, and specifically to photonic integrated circuits.

BACKGROUND

Silicon photonics are a good candidate for low cost and high-performance components, such as for increasing data centric technology. But packaging silicon photonics can be challenging and result in compatibility and integration challenges. Moreover, it can be challenging to route photonic integrated circuit ("PIC") signals to and from PIC, such as to fiber connectors and electronic integrated circuits ("EIC"). It is desired to have a low cost and efficient packaging technology that address these concerns, and other technical challenges.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
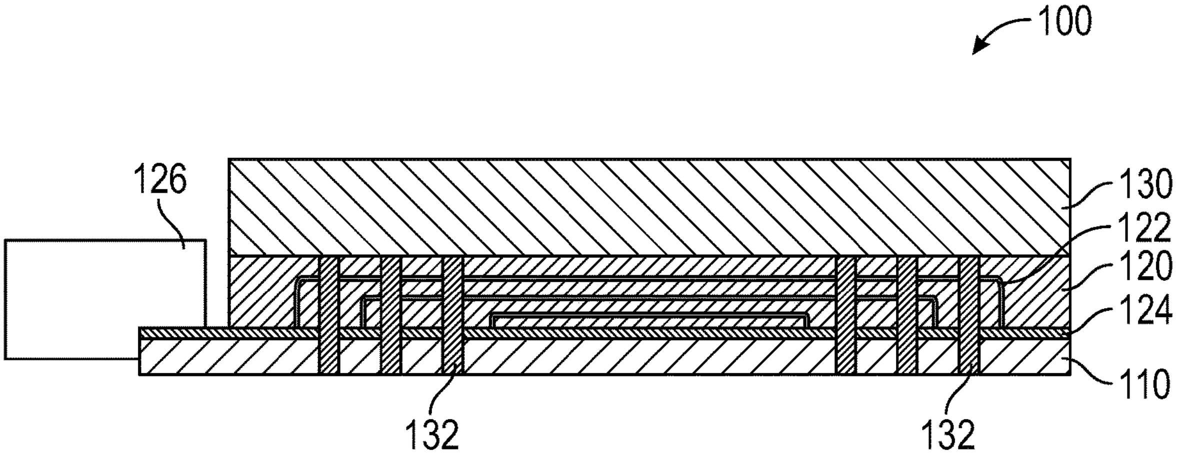
FIG. 1 depicts a schematic diagram of a photonic integrated circuit using a glass recirculatory layer in an example.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Silicon photonics (SiP) is a combination of silicon integrated circuits and semiconductor lasers, from which photonic integrated circuits (PICs) can be made. PICs can produce or detect optical light with single or multiple frequencies. PICs can extend, enable, and increase data transmission, while consuming less power than conventional circuits. Such PICs can allow for energy efficient bandwidth scaling. PICs can allow for faster data transmission over longer distances compared to traditional electronics.

However, silicon photonics packaging can be challenging. Fiber coupling compatibility and integration with electronic integrated circuits (EIC) can be difficult due to mode field diameter mismatches and tight alignment tolerances. The use of waveguides in glass can be a good solution for such SiP packaging, due in part to the optical and mechanical properties of glass.

The present disclosure describes, among other things, using a glass layer or substrate (referred to herein as a "glass recirculatory layer") to route optical signals with respect to a photonic integrated circuit (PIC). The glass recirculatory layer can be used as a substrate or a component attached to the PIC to help re-route various signals from and to the PIC and an associated electronic integrated circuit (EIC). The glass recirculatory layer can include waveguides to allow optical signal to route between desired locations.

Optical computing can use various silicon photonic components, arrays, and integrated circuits, such as Mach-Zehnder Interferometers (MZIs), Micro Ring Resonators (MRRs), phase shifters, or other PIC configurations, to allow for matrix multiplication, quantum logic gates, or other applications. However, as silicon photonics arrays increase in size to accommodate these applications, a larger number of optical signals should be routed, such as within photonic integrated circuits (PIC), or between PIC and electronic integrated circuits (EIC).

Specifically, as the size of silicon photonics compute arrays increase, optical signals from one location of such an array may need to be routed to another location, where there is risk of routing waveguides intersecting each other. This can cause intersections on an active silicon photonics layer. Such intersections can induce losses. Previous solutions addressed these challenges by adding waveguide layers, such as silicon or silicon nitride, on top of a PIC to route or recirculate optical signaling across the PIC. However, such amorphous silicon creates signal loss. While silicon nitride may have improved performance loss compared to crystalline silicon, silicon nitride also can require larger waveguide features and reduced routing density. Moreover, as the size of silicon photonic arrays increase, more passive waveguide layers would be required to achieve this routing, causing optical signals to be transferred between which would induce additional loss.

Discussed herein, a glass recirculatory layer is used as a substrate or a component with a PIC. The glass recirculatory layer can be attached and configured to allow routing of optical signals using glass waveguides and reduce signal loss. Such glass recirculatory layer can be formed using accessible techniques such as laser direct writing (LDW). Such methods can allow for a controlled z-height of waveguide formation, such as to reduce waveguide intersections. A cross-section of such a glass recirculatory layer would show the use of a glass substrate having waveguides at varying z-axis points.

In an example, a semiconductor assembly can include an electronic integrated circuit die; a photonic integrated circuit die coupled to the electronic integrated circuit die; and a glass recirculatory layer comprising one or more waveguides configured to route one or more optical signals from the photonic integrated circuit die.

In an example, a semiconductor assembly can include an electronic integrated circuit die; a photonic integrated circuit die coupled to the electronic integrated circuit die; and a glass recirculatory layer comprising one or more waveguides configured to route one or more optical signals from the photonic integrated circuit die; a housing; and a touchscreen.

In an example, a method of making a semiconductor assembly can include attaching a glass layer to a photonic integrated circuit; making a plurality of waveguides in the glass layer to produce a glass recirculatory layer, at least two of the plurality of waveguides at different heights; and connecting the photonic integrated circuit and the glass recirculatory layer to an electronic integrated circuit.

FIG. 1 depicts a representation of a cross-sectional diagram of a semiconductor assembly 100 including a photonic integrated circuit 110 using a glass recirculatory layer 120 in an example. The semiconductor assembly 100 can include the photonic integrated circuit 110, the glass recirculatory layer 120 with waveguides 122, a silicon photonic layer 124, an off-fiber connector 126, an integrated circuit 130, and via 132. In the semiconductor assembly 100, the glass recirculatory layer 120 can be situated between the photonic integrated circuit 110 and the integrated circuit 130.

The photonic integrated circuit (PIC) 110 can be configured to produce and receive multiple optical signals, such as in the visible or infrared (IR) spectrum. In some cases, the photonic integrated circuit 110 can be encapsulated by an over-mold layer. The photonic integrated circuit 110 can include single or multiple optical port where optical signals exit the photonic integrated circuit 110 towards the waveguides 122 in the glass recirculatory layer 120. The photonic integrated circuit 110 can be bonded to the glass recirculatory layer 120 such as through hybrid bonding. In some cases, bumps, pillars, and combinations thereof, can be used to bond the photonic integrated circuit 110 to the glass recirculatory layer 120. In an example, the photonic integrated circuit 110 and the glass recirculatory layer 120 can be fabricated separately.

The glass recirculatory layer 120 can be, for example, a silicon dioxide or borosilicate glass. In some cases, alternative glass materials can be used. The glass recirculatory layer 120 can include the waveguides 122 to allow for re-routing of one or more optical signals from the photonic integrated circuit 110. The glass recirculatory layer 120 can be attached to the photonic integrated circuit 110 by the silicon photonic layer 124 in an example. In some cases, gaps between the photonic integrated circuit 110 and the glass recirculatory layer 120 can be kept open air or filled with an index matching fluid. In some cases, the glass recirculatory layer 120 can act as a substrate in the semiconductor assembly 100. In some cases, the glass recirculatory layer 120 can act as a component in the semiconductor assembly 100. In some cases, the glass recirculatory layer 120 can be an amorphous glass or a crystalline glass.

The glass recirculatory layer 120 can be stacked over the silicon photonic layer 124. In this way, various locations on the glass recirculatory layer 120 and the silicon photonic layer 124 can be routed to each other through waveguides therein. Waveguides can be fabricated in the glass recirculatory layer 120 and/or the silicon photonic layer 124 as desired.

The waveguides 122 fabricated in the glass recirculatory layer 120 can be made using, for example, laser direct writing. The waveguides 122 can be a laser-modified waveguides situated in the glass recirculatory layer 120. The glass recirculatory layer 120 can be a separate piece of glass bonded to the photonic integrated circuit 110. The waveguides 122 can be in the glass recirculatory layer 120, extending between various locations of the photonic integrated circuit 110.

The waveguides 122 can be configured to guide electromagnetic waves, such as an optical signal produced by the photonic integrated circuit 110 within the assembly 100 or out towards an outlet such as the off-fiber connector 126. The waveguides 122 can be connected to one or more optical fibers through the off-fiber connector 126 or other types of outputs for such an optical signal. For example, the waveguides 122 can be aligned with a coupling port which is size and shaped for connection to an optical fiber. In some cases, such a coupling port can include V-grooves for connection with an optical fiber.

The waveguides 122 can be a laser-modified guide, such as by laser direct writing (LDW). The waveguides 122 can be manufactured within the glass recirculatory layer 120 for proper alignment. For example, the waveguides 122 can be cut at an angle allowing for appropriate alignment and guidance of optical signals produced by the photonic integrated circuit 110. In some cases, the waveguides 122 can be curved.

The waveguides 122 can include two or more waveguides, such as between various positions on the photonic integrated circuit 110, the integrated circuit 130, the off-fiber connector 126, or combinations thereof. The waveguides 122 can be situated at different locations within the glass recirculatory layer 120. For example, the waveguides 122 can be situated at different heights (e.g., z-axis points). The multitude of waveguides 122 can be situated to allow for optical signal routing between desired locations without having the waveguides 122 intersecting with each other.

The off-fiber connector 126 can be aligned with one or more of the waveguides 122 to allow movement of the optical signal out of the semiconductor assembly 100, such as to a fiber. The integrated circuit 130 can be an integrated circuit in communication with the photonic integrated circuit 110. The integrated circuit 130 can be hybrid bonded to the glass recirculatory layer 120.

The via 132 can include, for example, through glass via (TGV), through silicon via (TSV), a combined via traversing both the glass recirculatory layer 120 and PIC 110, or both a discrete TSV and discrete TGV that are electrically coupled. The via 132 can be used, for example, for power delivery, input/output, or other uses, such as between the photonic integrated circuit 110, the integrated circuit 130, other components, and substrates. For example, TGVs can be fabricated into the glass recirculatory layer 120, and TSVs can be fabricated into the photonic integrated circuit 110.

Figure 2:
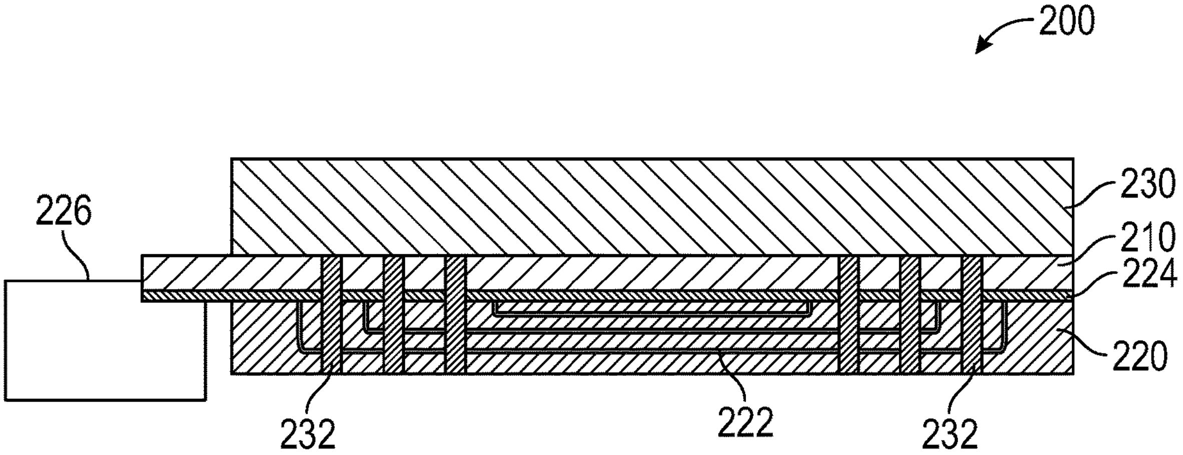
FIG. 2 depicts a schematic diagram of a photonic integrated circuit using a glass recirculatory layer in an example.

FIG. 2 depicts a schematic diagram of a semiconductor assembly 200 including a photonic integrated circuit 210 using a glass recirculatory layer 220 in an example. The semiconductor assembly 200 can include the photonic integrated circuit 210, the glass recirculatory layer 220 with waveguides 222, a silicon photonic layer 210*a*, an off-fiber connector 226, an electronic integrated circuit 230, and via 232. The semiconductor assembly 200 can include components similar to those in the semiconductor assembly 100.

However, in the semiconductor assembly 200, the photonic integrated circuit 210 can be situated between the electronic integrated circuit 230 and the glass recirculatory layer 220. In this case, the integrated circuit 230 can be bonded on top of the photonic integrated circuit 210. The glass recirculatory layer 220 can act as a package core or a substrate.

Figure 3:
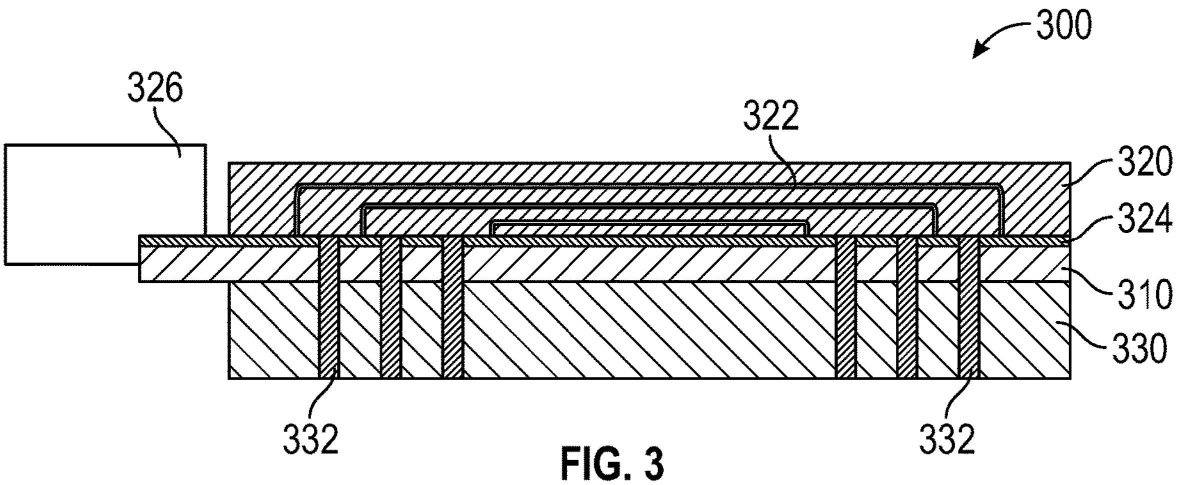
FIG. 3 depicts a schematic diagram of a photonic integrated circuit using a glass recirculatory layer in an example.

FIG. 3 depicts a schematic diagram of a semiconductor assembly 300 including a photonic integrated circuit 310 using a glass recirculatory layer 320 in an example. The semiconductor assembly 300 can include the photonic integrated circuit 310, the glass recirculatory layer 320 with waveguides 322, a silicon photonic layer 320*a*, an off-fiber connector 326, an electronic integrated circuit 330, and via 332. The semiconductor assembly 300 can include components similar to those in the semiconductor assembly 100.

However, in the semiconductor assembly 300, the photonic integrated circuit 310 can be situated between the glass recirculatory layer 320 and the electronic integrated circuit 330. In this case, the via 332 can include TSV that run through the photonic integrated circuit 310 and the silicon photonic layer 320*a*. In the semiconductor assembly 300, no TGVs are present.

The semiconductor assembly 100, semiconductor assembly 200, and semiconductor assembly 300 are examples of assemblies using a glass recirculatory layer for photonic integrated circuit optical signal routing. In some cases, such assemblies can be used in devices, such as within a housing. In some cases, devices can include other components such as buttons, touch screens, user interfaces, switches, lights, or other components as appropriate.

Figure 4A:
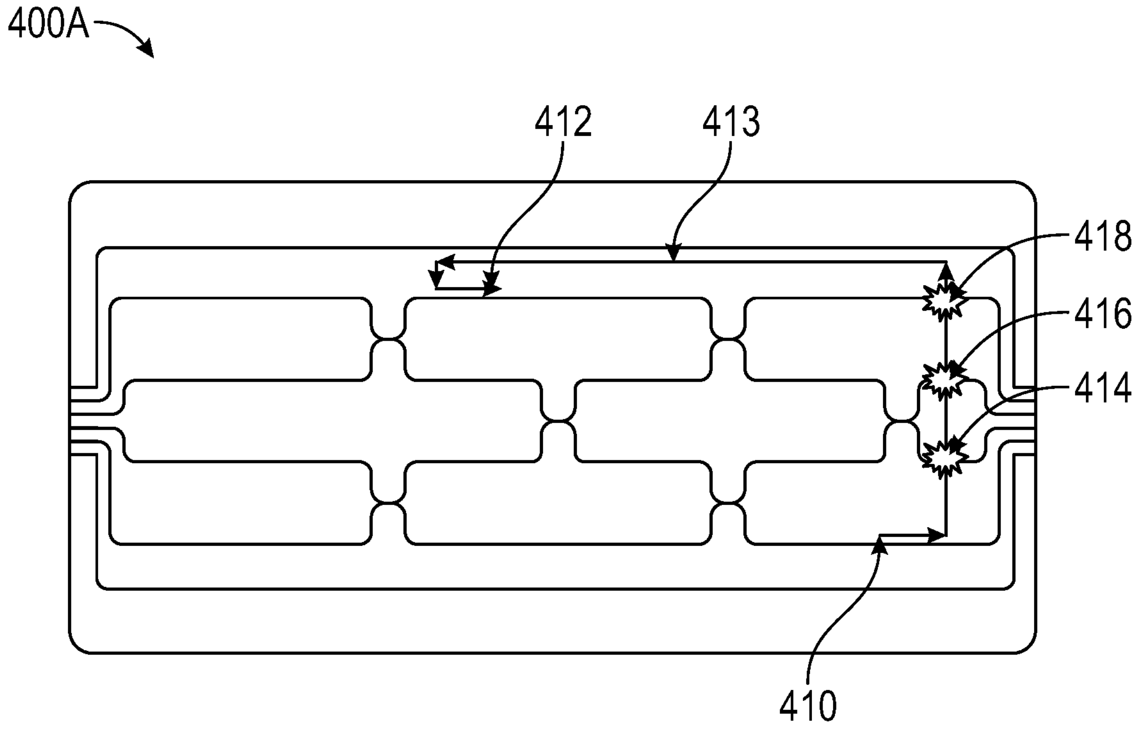
FIGS. 4A-4B are schematic diagrams depicting a glass recirculatory layer in an example.
Figure 4B:
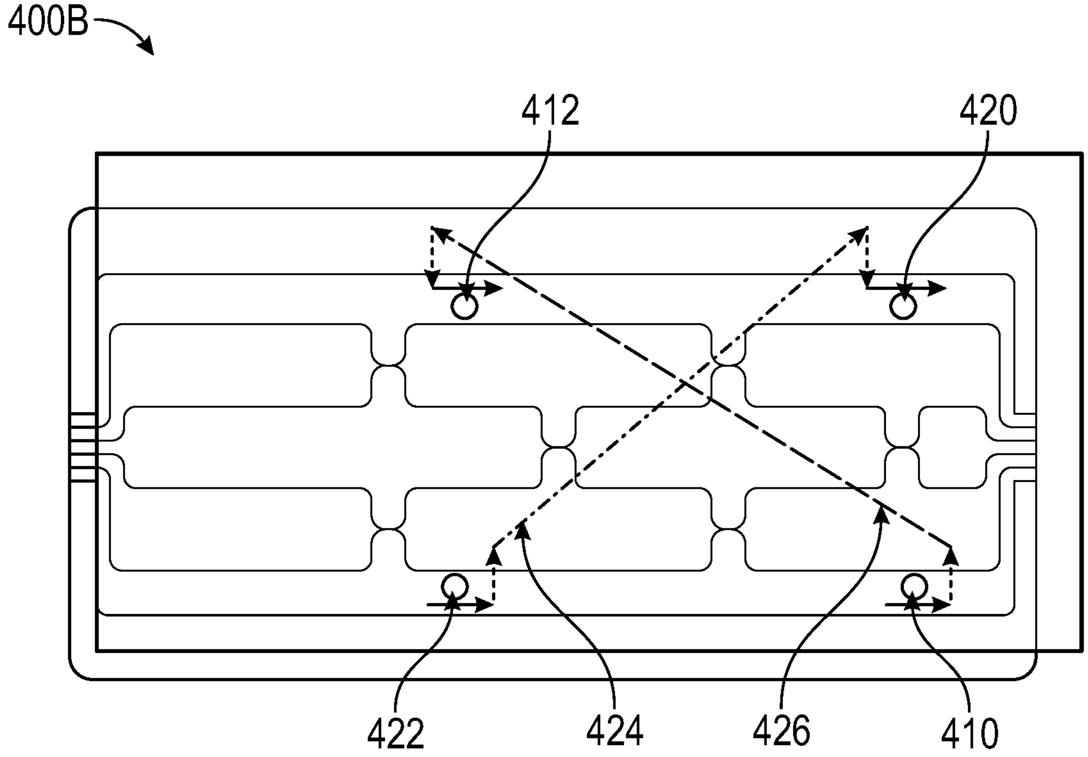

FIGS. 4A-4B are schematic diagrams depicting a stacked recirculatory layer 400 in an example. The stacked recirculatory layer 400 can include location 410, location 412, potential route 413 with intersection 414, intersection 416, intersection 418, and location 420, location 422, with waveguide 424 and waveguide 426. Here, waveguides can be fabricated at different z-heights in the glass recirculatory layer 400B to eliminate or reduce intersections.

As the size of silicon photonics compute arrays increase, optical signals from one location of an array may need to be routed to another location, waveguides between such locations may run into intersections that should be avoided to reduce losses. Optical computing using silicon photonic features, such as Mach-Zehnder Interferometers (MZIs), Micro Ring Resonators (MRRs), phase shifters, can be leveraged for quantum logic gates, such as for quantum photonics, or matrix multiplication, such as for artificial intelligence acceleration, among other applications.

Shown in FIG. 4A, an example silicon photonics layer 400A can include a first location 410 and a second location 412 that should be connected with a waveguide. In the glass recirculatory layer 400A, the waveguides and locations are located on the same plane, e.g., the same height within the silicon photonics layer 400A. In this case, the waveguide having potential route 413 for connecting the first location 410 and the second location 412 runs along three intersections 414, 416, 418. At each of the three intersections 414, 416, 418, the optical signal can be subject to loss.

By comparison, in FIG. 4B, a glass recirculatory layer 400B can be stacked over the silicon photonics layer 400A. The example glass recirculatory layer 400B can include locations 410, 412, 420, 422. These locations can be connected as desired with the waveguides 424 and 426 in the glass recirculatory layer 400B. In this case, the waveguide 424 can be situated at a different height (e.g., different z-axis) than the waveguide 426. For this reason, the number of intersections is decreased. Moreover, the stacked waveguides can help reduce overall intersections within the silicon photonics layer 400A. In some cases, the waveguides in the silicon photonics layer 400A and the glass recirculatory layer 400B can be crossed over each other in routing.

The glass recirculatory layer 400B can be stacked against a PIC or other silicon photonic layer and, using the waveguides, allow optical signals to route from location to location as desired. Coupling losses between silicon waveguides to glass waveguides can be about 0.2 dB or less per crossing. Other features such as delay lines, multiplexers, demultiplexers, or other features, can also be integrated in the glass recirculatory layer 400B for added functionality. Such MRRs or MZIs can be used in the silicon photonics layer to turn on or off waveguide channels in the glass recirculatory layer as needed.

Figure 5:
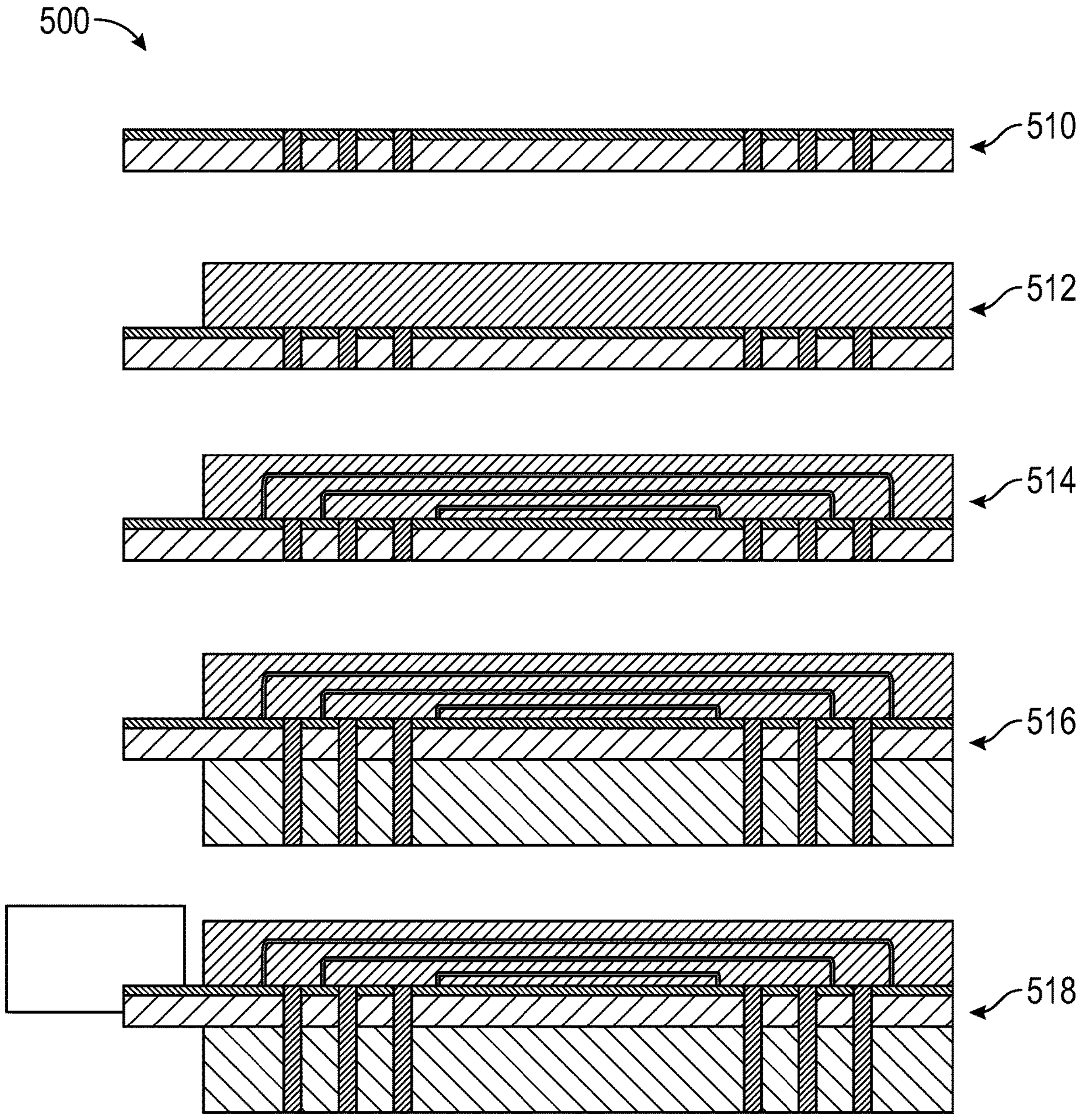
FIG. 5 depicts a schematic flow chart showing a method of making a photonic integrated circuit using a glass recirculatory layer in an example.

FIG. 5 depicts a schematic flow chart showing a method 500 of making a photonic integrated circuit using a glass recirculatory layer in an example. The method can include step 510, step 512, step 514, step 516, and step 518.

At step 510, the photonic integrated circuit (PIC) can include a silicon photonics layer for alignment with a glass recirculatory layer. Through silicon via (TSV) can be made in the photonic integrated circuit. At step 512, a glass recirculatory layer can be attached to the assembly on top of the silicon photonics layer.

At step 514, waveguides can be formed in the glass recirculatory layer, such as by laser direct writing. The waveguides can be formed within the glass recirculatory layer at varying heights, such as to allow routing of optical signals from the photonic integrated circuit without intersections.

At step 516, an electronic integrated circuit (EIC) can be attached to the assembly. The EIC can be attached, for example, by hybrid bonding, by solder bumps and fill, by pillars, or by other methods. In some cases, the EIC can be attached to the PIC opposite the glass recirculatory layer. The TSV can be extended through the EIC to allow for connectivity between the PIC and EIC, with optical signals routed through the PIC and glass recirculatory layer.

At step 518, an off-fiber connector can be attached to the assembly, such as to allow connecting the PIC to a fiber.

Figure 6:
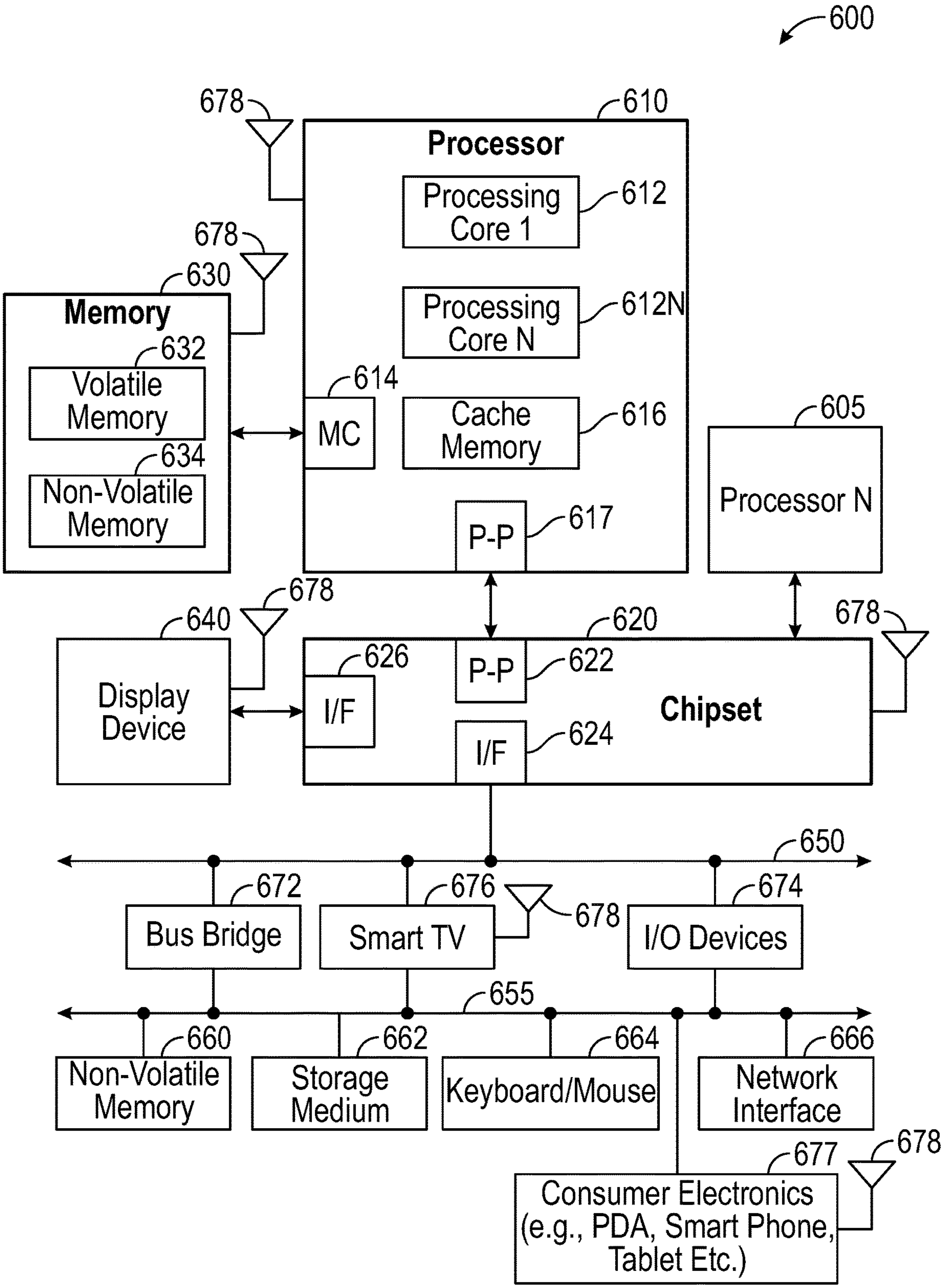
FIG. 6 depicts a system including a photonic integrated circuit using a glass recirculatory layer in an example.

FIG. 6 illustrates a system level diagram, depicting an example of an electronic device (e.g., system) that may include a PIC and a glass recirculatory and/or methods described above. In one embodiment, system 600 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 600 includes a system on a chip (SOC) system.

In one embodiment, processor 610 has one or more processor cores 612 and 612N, where 612N represents the Nth processor core inside processor 610 where N is a positive integer. In one embodiment, system 600 includes multiple processors including 610 and 605, where processor 605 has logic similar or identical to the logic of processor 610. In some embodiments, processing core 612 includes, but is not limited to, pre-fetch logic to fetch instructions, decode logic to decode the instructions, execution logic to execute instructions and the like. In some embodiments, processor 610 has a cache memory 616 to cache instructions and/or data for system 600. Cache memory 616 may be organized into a hierarchal structure including one or more levels of cache memory.

In some embodiments, processor 610 includes a memory controller 614, which is operable to perform functions that enable the processor 610 to access and communicate with memory 630 that includes a volatile memory 632 and/or a non-volatile memory 634. In some embodiments, processor 610 is coupled with memory 630 and chipset 620. Processor 610 may also be coupled to a wireless antenna 678 to communicate with any device configured to transmit and/or receive wireless signals. In one embodiment, an interface for wireless antenna 678 operates in accordance with, but is not limited to, the IEEE 802.11 standard and its related family, Home Plug AV (HPAV), Ultra-Wide Band (UWB), Bluetooth, WiMAX, or any form of wireless communication protocol.

In some embodiments, volatile memory 632 includes, but is not limited to, Synchronous Dynamic Random Access Memory (SDRAM), Dynamic Random Access Memory (DRAM), RAMBUS Dynamic Random Access Memory (RDRAM), and/or any other type of random-access memory device. Non-volatile memory 634 includes, but is not limited to, flash memory, phase change memory (PCM), read-only memory (ROM), electrically erasable programmable read-only memory (EEPROM), or any other type of non-volatile memory device.

Memory 630 stores information and instructions to be executed by processor 610. In one embodiment, memory 630 may also store temporary variables or other intermediate information while processor 610 is executing instructions. In the illustrated embodiment, chipset 620 connects with processor 610 via Point-to-Point (PtP or P-P) interfaces 617 and 622. Chipset 620 enables processor 610 to connect to other elements in system 600. In some embodiments of the example system, interfaces 617 and 622 operate in accordance with a PtP communication protocol such as the Intel® Quick Path Interconnect (QPI) or the like. In other embodiments, a different interconnect may be used.

In some embodiments, chipset 620 is operable to communicate with processor 610, 605N, display device 640, and other devices, including a bus bridge 672, a smart TV 676, I/O devices 674, nonvolatile memory 660, a storage medium (such as one or more mass storage devices) 662, a keyboard/mouse 664, a network interface 666, and various forms of consumer electronics 677 (such as a PDA, smart phone, tablet etc.), etc. In one embodiment, chipset 620 couples with these devices through an interface 624. Chipset 620 may also be coupled to a wireless antenna 678 to communicate with any device configured to transmit and/or receive wireless signals. In one example, any combination of components in a chipset may be separated by a continuous flexible shield as described in the present disclosure.

Chipset 620 connects to display device 640 via interface 626. Display 640 may be, for example, a liquid crystal display (LCD), a light emitting diode (LED) array, an organic light emitting diode (OLED) array, or any other form of visual display device. In some embodiments of the example system, processor 610 and chipset 620 are merged into a single SOC. In addition, chipset 620 connects to one or more buses 650 and 655 that interconnect various system elements, such as I/O devices 674, nonvolatile memory 660, storage medium 662, a keyboard/mouse 664, and network interface 666. Buses 650 and 655 may be interconnected together via a bus bridge 672.

In one embodiment, mass storage device 662 includes, but is not limited to, a solid-state drive, a hard disk drive, a universal serial bus flash memory drive, or any other form of computer data storage medium. In one embodiment, network interface 666 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra-Wide Band (UWB), Bluetooth, WiMAX, or any form of wireless communication protocol.

While the modules shown in FIG. 6 are depicted as separate blocks within the system 600, the functions performed by some of these blocks may be integrated within a single semiconductor circuit or may be implemented using two or more separate integrated circuits. For example, although cache memory 616 is depicted as a separate block within processor 610, cache memory 616 (or selected aspects of 616) can be incorporated into processor core 612.

Various Notes & Examples

To better illustrate the method and apparatuses disclosed herein, a non-limiting list of embodiments is provided here:

Example 1 is a semiconductor assembly comprising: an electronic integrated circuit die; a photonic integrated circuit die coupled to the electronic integrated circuit die; and a glass recirculatory layer comprising one or more waveguides configured to route one or more optical signals from the photonic integrated circuit die.

In Example 2, the subject matter of Example 1 optionally includes a silicon phonic layer between the photonic integrated circuit die and the glass recirculatory layer.

In Example 3, the subject matter of any one or more of Examples 1-2 optionally include wherein the glass recirculatory layer comprises a plurality of waveguides, at least two of the plurality of waveguides at different heights.

In Example 4, the subject matter of any one or more of Examples 1-3 optionally include wherein the glass recirculatory layer comprises an amorphous glass.

In Example 5, the subject matter of any one or more of Examples 1~4 optionally include wherein the glass recirculatory layer comprises a crystalline glass.

In Example 6, the subject matter of any one or more of Examples 1-5 optionally include wherein the glass recirculatory layer is attached between the electronic integrated circuit die and the photonic integrated circuit die.

In Example 7, the subject matter of any one or more of Examples 1-6 optionally include wherein the glass recirculatory layer is attached between to the photonic integrated circuit die on a side opposite the electronic integrated circuit die.

In Example 8, the subject matter of any one or more of Examples 1-7 optionally include wherein the glass recirculatory layer comprises two or more waveguides, each aligned at a different z-axis.

In Example 9, the subject matter of any one or more of Examples 1-8 optionally include wherein the glass recirculatory layer comprises a substrate.

In Example 10, the subject matter of any one or more of Examples 1-9 optionally include wherein the glass recirculatory layer comprises a component.

In Example 11, the subject matter of any one or more of Examples 1-10 optionally include via including through glass via, through silicon via, or combinations thereof. In Example 12, the subject matter of Example 11 optionally includes wherein the via are configured to allow connection from the electronic integrated circuit to power, input, output, or combinations thereof.

In Example 13, the subject matter of any one or more of Examples 1-12 optionally include wherein the photonic integrated chip comprises one or more Mach-Zehner Interferometers, Micro Ring Resonators, phase shifters, or combinations thereof.

Example 14 is a device comprising: a semiconductor assembly comprising: an electronic integrated circuit die; a photonic integrated circuit die coupled to the electronic integrated circuit die; and a glass recirculatory layer comprising one or more waveguides configured to route one or more optical signals from the photonic integrated circuit die; a housing; and a touchscreen.

In Example 15, the subject matter of Example 14 optionally includes wherein the glass recirculatory layer comprises a plurality of waveguides.

In Example 16, the subject matter of Example 15 optionally includes wherein at least two of the plurality of waveguides are at different heights within the glass recirculatory layer.

Example 17 is a method of making a semiconductor assembly, the method comprising: attaching a glass layer to a photonic integrated circuit; making a plurality of waveguides in the glass layer to produce a glass recirculatory layer, at least two of the plurality of waveguides at different heights; and connecting the photonic integrated circuit and the glass recirculatory layer to an electronic integrated circuit.

In Example 18, the subject matter of Example 17 optionally includes wherein making a plurality of waveguides comprises laser direct writing.

In Example 19, the subject matter of any one or more of Examples 17-18 optionally include wherein connecting the photonic integrated circuit comprises hybrid bonding or solder bumps.

In Example 20, the subject matter of any one or more of Examples 17-19 optionally include connecting the photonic integrated circuit to one or more optical fibers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A semiconductor assembly comprising:

an electronic integrated circuit die;

a photonic integrated circuit die coupled to the electronic integrated circuit die; and a glass-layer comprising a plurality of waveguides at different z-axis heights, wherein the waveguides are configured to route one or more optical signals from the photonic integrated circuit die, through the glass layer, and back to the photonic integrated circuit die without routing the optical signals to the electronic integrated circuit die.

2. The semiconductor assembly of claim 1, further comprising a silicon photonic layer between the photonic integrated circuit die and the glass layer.

3. The semiconductor assembly of claim 1, wherein the glass layer comprises a plurality of waveguides, at least two of the plurality of waveguides at different heights.

4. The semiconductor assembly of claim 1, wherein the glass layer comprises an amorphous glass.

5. The semiconductor assembly of claim 1, wherein the glass layer comprises a partially crystalline glass.

6. The semiconductor assembly of claim 1, wherein the glass layer is attached between the electronic integrated circuit die and the photonic integrated circuit die.

7. The semiconductor assembly of claim 1, wherein the glass layer is attached to the photonic integrated circuit die on a side opposite the electronic integrated circuit die.

8. The semiconductor assembly of claim 1, wherein the glass layer comprises three or more waveguides, each aligned at a different z-axis.

9. The semiconductor assembly of claim 1, wherein the glass layer comprises a substrate.

10. The semiconductor assembly of claim 1, wherein the glass layer further comprises a component.

11. The semiconductor assembly of claim 1, further comprising through glass vias in the glass layer.

12. The semiconductor assembly of claim 11, wherein the through glass vias are configured to allow connection from the electronic integrated circuit to power, input, output, or combinations thereof.

13. The semiconductor assembly of claim 1, wherein the photonic integrated circuit die comprises one or more Mach Zehnder Interferometers, Micro Ring Resonators, phase shifters, or combinations thereof.

14. A device comprising:

a semiconductor assembly comprising:

an electronic integrated circuit die;

a photonic integrated circuit die coupled to the electronic integrated circuit die; and a glass layer comprising a plurality of waveguides at different z-axis heights within the glass layer, wherein t aides are configured to route one or more optical signals from the photonic integrated circuit die, through the glass layer and back to the photonic integrated circuit die without routing the optical signals to the electronic integrated circuit die;

a housing; and a touchscreen.

15. The device of claim 14, wherein the plurality of waveguides comprises three or more waveguides.

16. The device of claim 15, wherein at least two three of the plurality of waveguides are at different heights within the glass layer.

17. A method of making a semiconductor assembly, the method comprising:

attaching a glass layer to a photonic integrated circuit;

making a plurality of waveguides in the glass layer to produce a glass layer, at least two of the plurality of waveguides at different z-axis heights within the glass layer wherein the waveguides are configured to route one or more optical signals from the photonic integrated circuit, through the glass layer, and back to the photonic integrated circuit without routing the optical signals to an electronic integrated circuit; and connecting the photonic integrated circuit and the glass layer to the electronic integrated circuit.

18. The method of claim 17, wherein making a plurality of waveguides comprises laser direct writing.

19. The method of claim 17, wherein connecting the photonic integrated circuit comprises hybrid bonding or solder bumps.

20. The method of claim 17, further comprising connecting the photonic integrated circuit to one or more optical fibers.

* * * * *